Sept. 26, 1967   L. MILLER, JR   3,344,290
ELECTROMAGNETIC INDICATING DEVICE
Filed March 5, 1965   6 Sheets-Sheet 1

INVENTOR
LESTER MILLER, JR.

BY
ATTORNEY

INVENTOR.
LESTER MILLER, JR.
BY
ATTORNEY

Sept. 26, 1967 L. MILLER, JR 3,344,290
ELECTROMAGNETIC INDICATING DEVICE
Filed March 5, 1965 6 Sheets-Sheet 3

INVENTOR
LESTER MILLER, JR.

BY *Stewart F. Moore*
ATTORNEY

Sept. 26, 1967    L. MILLER, JR    3,344,290
ELECTROMAGNETIC INDICATING DEVICE
Filed March 5, 1965    6 Sheets-Sheet 4

INVENTOR
LESTER MILLER, JR.

BY
ATTORNEY

Sept. 26, 1967 L. MILLER, JR 3,344,290
ELECTROMAGNETIC INDICATING DEVICE
Filed March 5, 1965 6 Sheets-Sheet 5

INVENTOR
LESTER MILLER, JR.

BY
/ATTORNEY

Sept. 26, 1967 L. MILLER, JR 3,344,290
ELECTROMAGNETIC INDICATING DEVICE
Filed March 5, 1965 6 Sheets-Sheet 6

INVENTOR
LESTER MILLER, JR.
BY
ATTORNEY

United States Patent Office 3,344,290
Patented Sept. 26, 1967

3,344,290
ELECTROMAGNETIC INDICATING DEVICE
Lester Miller, Jr., Danbury, Conn., assignor to American Machine & Foundry Company, a corporation of New Jersey
Filed Mar. 5, 1965, Ser. No. 437,492
15 Claims. (Cl. 310—21)

ABSTRACT OF THE DISCLOSURE

This invention relates to an electromagnetically operated high-speed printer module. A printing or display wheel having alphanumeric characters disposed about its outer periphery is adapted to be advanced in discrete steps by an electromagnetic coil and armature arrangement through appropriate linkage. The printer acuating components are packaged into a very thin housing thus allowing the printing or display of more characters per linear inch when a plurality of such printers are arranged in juxtaposition. Additionally, the printer operates at a stepping speed which is significantly high.

---

This invention relates to stepping motors and devices embodying the same. More particularly, the invention is directed to unusually compact stepping motors and stepping motor devices which are especially suitable in applications requiring modular assembly of a plurality of like devices.

Numerous industrial applications require stepping motors which can be installed in very small space. For example, in systems where data developed by a computer or the like is to be printed out or visually displayed, it is desirable to employ a stepping motor device in the printing or display mechanism. In cases where the data is to be printed out, as in the form of a bill, record card or the like, a separate stepping motor device is required for each digit or character to be printed. Similarly, in cases where the data is to be displayed, a separate stepping motor operated unit can be required for each character to be displayed. The data to be printed or displayed frequently involves numerous characters, so that a corresponding number of stepping motor devices are required. Since the total space for the equipment is restricted, only a relatively small space is available to accommodate the stepping motor devices, and severe difficulties have heretofore been encountered in attempting to provide a stepping motor device which is operationally satisfactory, yet small enough to be used. When the data is to be printed, the space available is further restricted by the desirability of having the printed characters spaced apart, in line center-to-center, by distances on the order of 3/16 inch, this being the spacing accomplished with conventional manually operated data printers. Since a separate stepping motor-operated printer device is required for each character, it is thus desirable that the device have a thickness not greater than 3/16 inch.

The difficulties arising from such severe size limitations are compounded by the requirement for a high operating speed to match the high speed operation of the modern data processing equipment to which the device must frequently reespond. Thus, in many applications, devices to which the invention is directed should be capable of operating at stepping rates on the order of 40–120 steps per second.

One object of the invention is to provide an improved stepping motor which is particularly useful for applications where the size of the motor must be minimized.

Another object is to devise a stepping motor which is especially adapted for use as a modular unit of very small thickness, so that a relatively large number of the units can be installed side-by-side in a small space.

A further object is to provide such a stepping motor which, despite its small size, is capable of dependable operation at high speeds.

Yet another object is to provide an electromagnetically operated stepping motor in which optimum operating power is achieved, despite the small size of the unit, via a novel and improved electromagnet, armature and operating lever combination.

A still further object is to device a small, flat stepping motor-operated device, such as a printer, which is specially adapted for side-by-side modular assembly.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
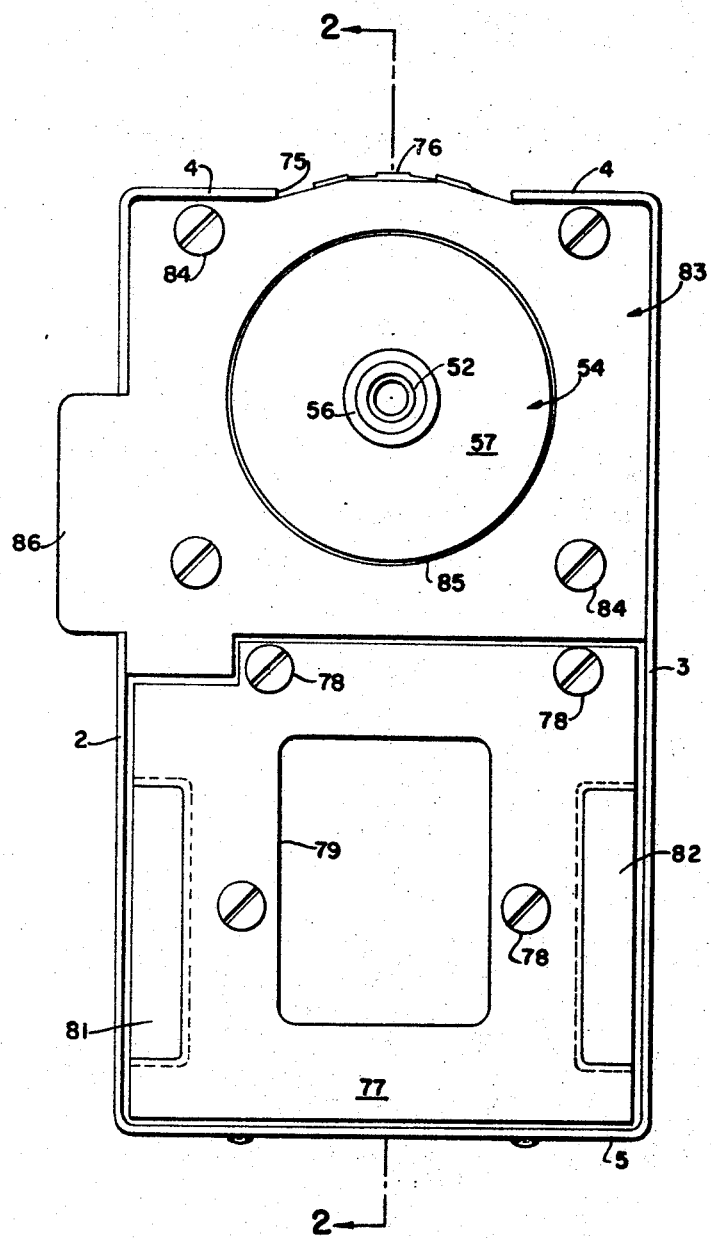
FIG. 1 is a side elevational view of a printer module constructed in accordance with one embodiment of the invention.

Turning now to the drawings in detail, and first to FIGS. 1–13 thereof, the embodiment of the invention here illustrated is a printer module which can be employed, for example, in printing a bill or the like in accordance with data developed by an electronic data processing system. The device includes a flat frame plate 1 having side edge flanges 2 and 3 and end edge flanges 4 and 5, the edge flanges 2–5 projecting the right angles to the flat surface presented by plate 1, and, with the plate, defining a shallow chamber which is rectangular in plan and also in cross-section (FIGS. 1, 3).

An electromagnet, indicated generally at 6, is carried by plate 1 and includes a magnetic core 7 and an energizing winding 8. The core 7 is a flat laminated structure of magnetic material of high permeability. The core is in the shape of an E, having a base 9, a center leg 10 and outer legs 11 and 12, as seen in FIG. 3. Legs 10–12, as shown, are of substantially equal length but one leg, for example leg 10, may be shorter than the other to minimize the effect of magnetic remanence and eliminate the necessity for a non-magnetic shim. As will be clear from legs 10–12, FIGS. 7 and 8, have free end portions which terminate in flat pole faces all lying in a common plane which is parallel to base 9 and at right angles to the plane defined by the base and legs of the core. Though the entire core structure is of uniform thickness, the center leg 10 is substantially wider than are outer legs 11 and 12.

Figure 12:
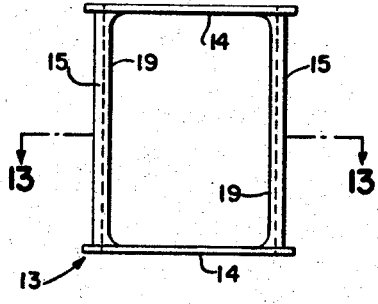
FIG. 12 is a side elevational view of a bobbin employed in the electromagnet of the device of FIG. 1.
Figure 13:
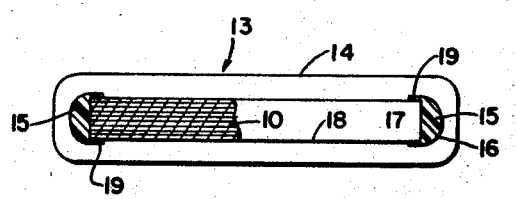
FIG. 13 is a sectional view taken on line 13—13, FIG. 12.

The winding 8 comprises a coil of insulating copper wire or its equivalent wound on an insulating bobbin 13, shown in detail in FIGS. 12 and 13. Formed as an integral unit from a suitable synthetic resinous material, for example, such as a superpolymeric amide (nylon), the bobbin 13 comprises parallel end flanges 14 interconnected by parallel, spaced side member 15. Each side member 15 has a rounded outer surface 16 and a flat inner surface 17, the surfaces 17 facing each other across the width of the bobbin. Each end flange 14 is provided with a centered rectangular opening 18, FIG. 13, of such size and configuration as to snugly accommodate the center leg 10 of core 7. The width of the flat inner surface 17 of each side member 15 of the bobbin is equal to the width of the openings 18. Along each long edge of surface 17, each of the side members 15 is provided with a thin, narrow flange 19, so that, in transverse cross-section, the side members 15 each have the shape of a shallow U. When the bobbin 13 is slipped over center leg 10 of the core, the flat surfaces 17 of side members 15 directly engage the narrow sides of center leg 10, while the flanges 19 embrace leg 10.

The winding or coil of the electromagnet is formed on bobbin 13 at a time when the bobbin is supported by a mandrel (not shown), so that the forces involved in winding the coil do not collapse the bobbin. In the completed coil structure, the bobbin 13 is effective to retain coil 8 in place on leg 10, and the side members 15 of the bobbin protect the wire of the coil from contact with the sharp corners presented by leg 10. However, since end flanges 14 and side members 15 of the bobbin define a rectangular open space, the main side portions of the coil, which need not be protected from contact with leg 10, can lie in contact with or in immediate proximity to the surfaces of the leg. Accordingly, the overall thickness of the coil, in a direction at right angles to the plane defined by the legs of the core, is little more than the thickness of the core plus the thickness of the winding.

Figure 2:
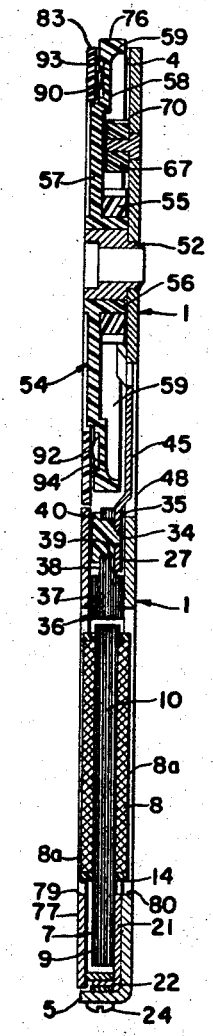
FIG. 2 is a longitudinal sectional view taken on line 2—2, FIG. 1.
Figure 3:
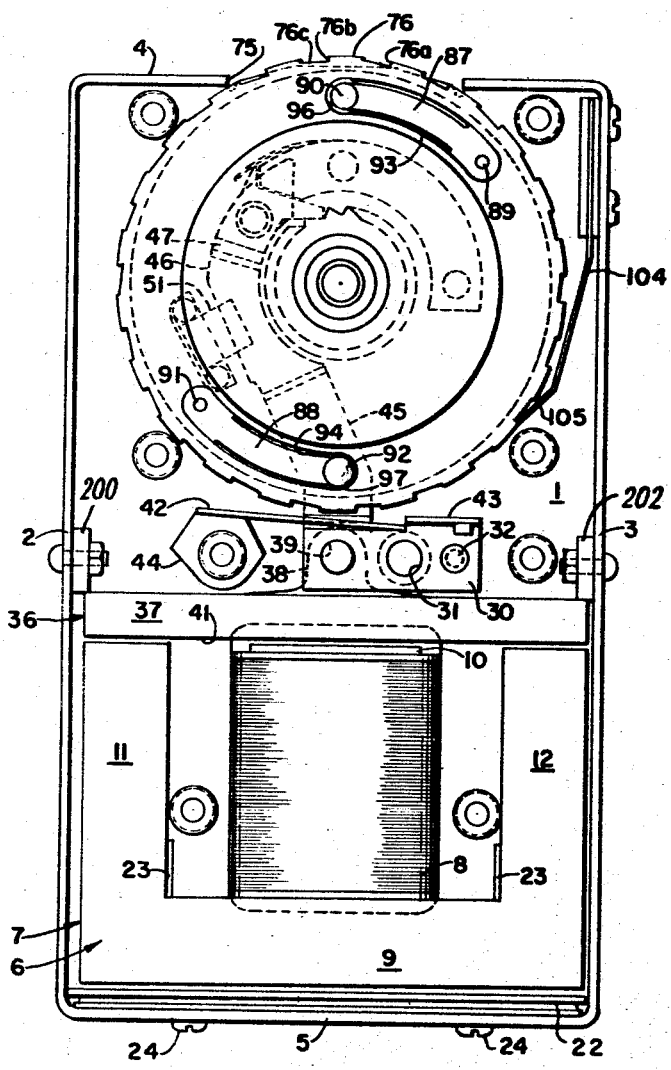
FIG. 3 is an elevational view similar to FIG. 1 but with parts removed for clarity of illustration.

The core 7 is disposed immediately adjacent to the main flat surface of frame plate 1 from which the edge flanges 2–5 project, the core being positioned by a locator member 21, FIGS. 2 and 3, which is generally U-shaped, so as to provide a base portion which underlies base 9 of the core, and two leg portions each of which underlies a different one of the outer legs 10 and 11 of the core, these portions of the locator member serving to space the core slightly away from frame plate 1. Locator member 21 also includes a flange 22, FIG. 2, disposed adjacent to and parallel with the inner face of flange 5. Member 21 also includes two upstanding projections 23, FIG. 3, which engage the faces of outer legs 11 and 12, respectively, which are directed toward the center leg of the core. Projections 23 also engage base 7 of the core. Locator member 21 is fixed to flange 5, as by screws 24, FIGS. 1–3.

The electromagnet 6 can be considered as having a longitudinal axis which extends through the center of center leg 10 of core 7, this longitudinal axis extending parallel to the side flanges 2 and 3 of the frame plate and being centered therebetween. In a location spaced from the free ends of core legs 10–12 in the direction of end flange 4, there is secured to frame plate 1 a pivot pin 25, the pivot pin projecting at right angles to the frame plate. Pivot pin 25 is spaced laterally from the longitudinal axis of the electromagnet toward side flange 3. Pivotally supported by pin 25 is a lever indicated generally at 26 and shown in detail in FIGS. 5 and 6. Fabricated from stiff sheet metal, lever 26 includes a flat rectangular portion 27 and an arm portion 28. Intermediate its ends, portion 27 is provided with an opening 29. Carried by portion 27 of the lever is a generally rectangular block 30, FIG. 3, which includes a bushing portion accommodated by opening 29 and providing a cylindrical bearing surface 31 which embraces the pivot pin 25. At one end, block 30 is fixed to lever portion 27 by a screw 32 engaged in the threaded opening provided by a boss 33, FIG. 6, secured to portion 27. At its other end, portion 27 of the lever is provided with a circular opening 34, FIG. 2. The corresponding end portion of bushing block 30 includes an integrally formed pivot pin portion 35, FIG. 2 which has a cylindrical tip section engaged in opening 34.

Operatively associated with electromagnet 6 is a magnetic armature indicated generally at 36 and including a main body portion 37 which is rectangular in side elevation and in transverse cross-section. The armature also includes a mounting ear 38, FIGS. 2 and 3, which projects from the center of the edge of body portion 37 which is opposite the electromagnet. Ear 38 is provided with a circular opening 39 which embraces pivot pin portion 35 of block 30. Accordingly, block 30 serves not only to provide the bushing for pivoting lever 26 on pin 25, but also as means for pivotally attaching the armature 36 to the lever. The axis of pivotal movement of the armature, relative to the lever, is defined by portion 35 of block 30 and intersects or extends immediately adjacent to the longitudinal axis of the electromagnet, depending upon the pivotal position of lever 26. At pivot pin portion 35, block 30 is provided with shoulder portions 40, FIG. 2, which engage the side of mounting ear 38 opposite lever portion 27, so that the mounting ear of the armature is snugly retained between shoulders 40 and lever portion 27, though the armature is free to pivot relative to the lever. The main body 37 of the armature presents a flat rectangular face 41 directed toward the flat rectangular end faces of the legs 10–12 of core 7. The length of main body portion 37 of the armature is at least substantially equal to the overall width of core 7.

A leaf spring 42 has one of its end portions secured to the lever assembly by being clamped between a flange 43 on lever portion 27 and a cooperating surface presented by block 30. The free end of spring 42 projects well beyond the pivotal connection between the armature and the lever and is disposed in engagement with an adjusting cam 44, FIG. 3. Cam 44 has a plurality of flat sides spaced at different distances from the center of rotation of the cam, so that the cam can be rotationally adjusted to select various deflections of spring 42. Cam 44 is journaled in a suitable opening in bearing plate 1 and presents an exterior end portion 44a, FIG. 4, so that the cam can be adjusted by manipulation of a screw driver or the like even though the device is fully assembled and enclosed.

Figure 5:
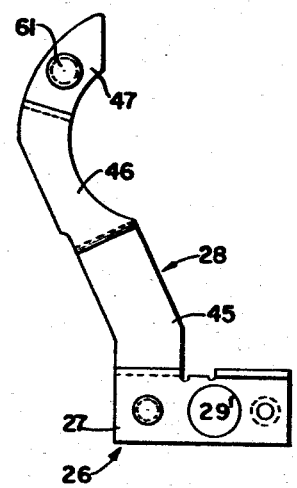
FIGS. 5 and 6 are side and edge elevational views, respectively, of a pawl-carrying lever employed in the device of FIG. 1.
Figure 6:
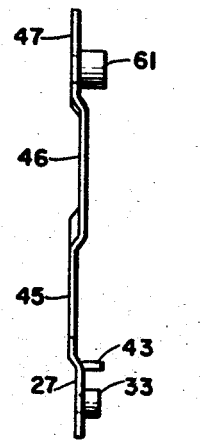
Figure 4:
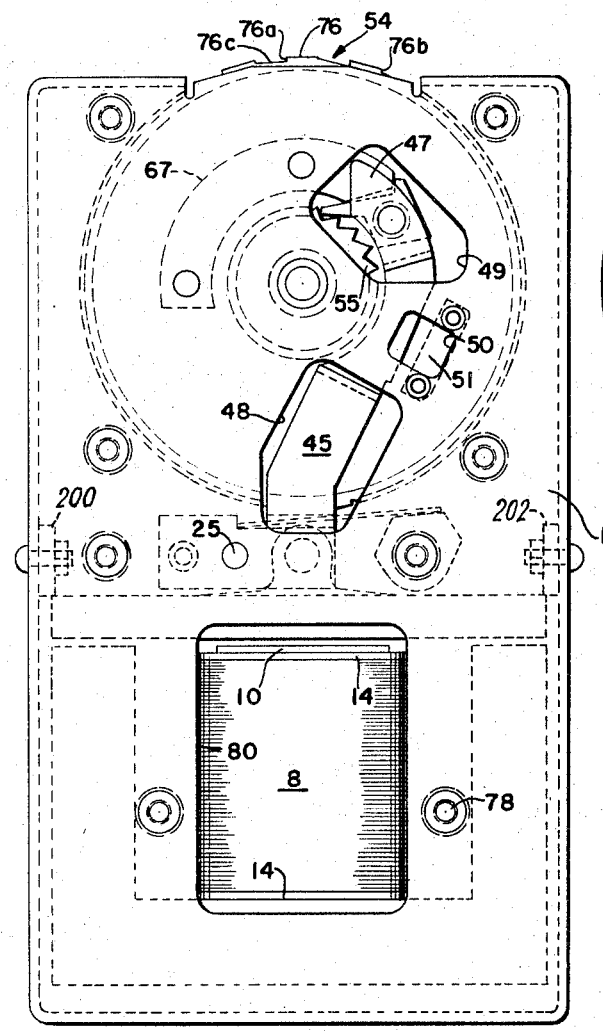
FIG. 4 is a side elevational view of the device of FIG. 1, taken from the opposite side as compared to FIG. 1.

Arm 28 of the lever includes a first portion 45, FIGS. 5 and 6, which is adjacent rectangular portion 27. The arm also includes an intermediate portion 46 and an end portion 47. Portions 27 and 46 of arm 28 lie in a first common plane, while portions 45 and 47 lie in a second common plane parallel to but spaced from the first plane. As seen in FIG. 1, frame plate 1 is provided with openings 48 and 49 of such size and configuration as to freely accommodate lever arm portions 45 and 47, respectively. Lever portion 27 lies immediately adjacent to the flat main surface of frame plate 1 which is enclosed by edge flanges 2–5. Portions 45 and 47 of the lever arm are offset from portion 27 by such an amount, and in such direction, that lever arm portions 45 and 47 lie approximately in the same plane as frame plate 1. As will be clear from FIGS. 3 and 4, the frame plate is provided with an opening 50 which accommodates a slide bearing member 51, the slide bearing member being secured rigidly to the frame plate and presenting a main surface spaced very slightly from the frame plate toward the lever arm, so that the lever arm slides on the bearing plate and is kept out of sliding contact with the frame plate.

Figure 10:
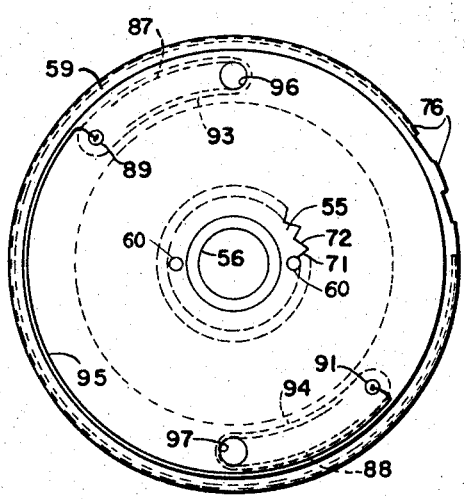
FIG. 10 is a rear elevational view of a driven structure, including a ratchet wheel and a printer wheel, forming part of the device of FIG. 1.
Figure 11:
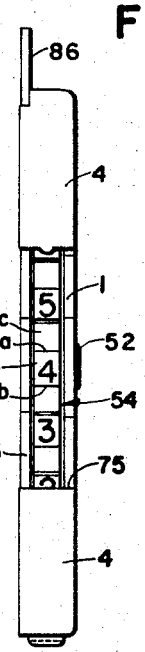
FIG. 11 is an end elevational view of the device of FIG. 1.

At a point between end flange 4 and the location of armature 36, a hollow cylindrical bearing pin 52 is secured to frame plate 1. Bearing pin 52 projects from frame plate 1 at right angles, in the same direction as do edge flanges 2–5 and is centered on the longitudinal axis of the electromagnet. Bearing pin 52 rotatably supports a driven structure indicated generally at 53 and comprising a printer wheel 54 and a ratchet wheel 55. As best seen in FIGS. 1, 3 and 10, the printer wheel 54 is an integral unit including a hub 56, a flat circular intermediate portion 57 which extends at right angles to the hub, an outer annular portion 58 which is concentric with the axis of hub 56 and offset from but parallel to intermediate portion 57, and a peripheral flange 59. Portion 57 joins one end portion of hub 56, so that the hub projects in one direction from the plane of portion 57. The outer annular portion 58 is offset from portion 57 in the same direction as the hub projects. Similarly, the peripheral flange 59 projects from portion 58 in the same direction as hub 56.

The ratchet wheel 55 is annular, embracing hub 56 and lying in direct engagement with portion 57 of the printer wheel. The ratchet wheel is rigidly secured to the printer wheel, as by screws 60, FIG. 10.

With the end of hub 56 opposite the flat portion 57 of the printer wheel disposed in sliding engagement with frame plate 1, the peripheral flange 59 of the printer wheel extends into close proximity with the frame plate. The positions of opening 48 in frame plate 1 and the offset portion of lever arm 28 are such, relative to the location of bearing pin 52, that the peripheral flange 59 of the printer wheel traverses the area occupied by opening 48 and portion 45 of the lever arm. Accordingly, even though the peripheral flange of the printer wheel extends into close proximity with the frame plate, it is spaced from the lever arm by reason of the fact that portion 45 of the lever arm is offset into opening 48 and away from the printer wheel. Though the intermediate portion 46 of lever arm 28 is spaced slightly toward the printer wheel, this portion of the lever arm occupies a position opposite portion 57 of the printer wheel which portion is spaced from frame plate 1 by a distance which is large as compared to the thickness of the lever arm. Accordingly, there is a substantial space between portion 57 of the printer wheel and portion 46 of the lever arm.

A pivot pin 61 is rigidly fixed to end portion 47 of the lever arm, the pivot pin projecting at right angles to the plane of portion 47 and, therefore, at right angles to frame plate 1. Pin 61 pivotally supports a pawl 62 which includes a main body 63, a pawl arm 64 projecting from the main body, a stop surface 65 defining one side of the pawl arm, and an ear 66. Lever arm 28 projects past the toothed peripheral surface of the ratchet wheel, the edges of arm portions 46 and 47 adjacent the ratchet wheel being of circular configuration, as best seen in FIGS. 5–8, so that the lever arm itself does not engage the ratchet wheel under any of the normal conditions of operation of the lever.

Between bearing pin 52 and edge flange 4, there is secured to frame member 1 and arcuate stop member 67 which presents a stop surface 68 directed toward the stop surface 65 of the pawl. Stop surface 68 is disposed generally chordally with respect to the ratchet wheel. Stop member 67 also includes a surface 69, projecting from stop surface 68 at an angle approximately equal to the angle between ear 66 and stop surface 65 of the pawl.

The pawl is resiliently restrained by an arcuate leaf spring 70, one end of spring 70 being rigidly attached to member 67. Spring 70 extends generally along the outer edge of arcuate member 67 and projects past ear 66 of the pawl so as to act on the edge of the pawl which is directed away from the ratchet wheel.

The teeth of ratchet wheel 55 are all identical, each having a short side 71 and a long side 72. Pawl arm 64 has an end face 73 and a side face 74. The angle between faces 73 and 74 of pawl arm 64 is at least substantially equal to the angle between faces 71 and 72 of the teeth of ratchet wheel 55. Accordingly, since the pawl is free to pivot relative to lever arm 28, the faces 73 and 74 of the pawl arm can lie in flush engagement with a short tooth side 71 and a long tooth side 72, respectively, both when the lever arm is in the position resulting from deenergization of the electromagnet (seen in FIG. 7) and when the lever arm is in the position resulting from energization of the electromagnet (seen in FIG. 8). The resilient action of spring 70 serves to urge the pawl pivotally in a direction to keep the end of the pawl arm in engagement with the teeth of the ratchet wheel.

Edge flange 4 is centrally interrupted to provide a window or opening, indicated at 75, FIG. 3. The location of bearing pin 52 and the radial dimension of printer wheel 54 are such that the peripheral surface of the printer wheel traverses a course which extends through the opening 75. Presented by flange 59, the peripheral surface of the printer wheel is provided with a plurality of printing element portions 76, which may be in the nature of type characters well known in the printer art. Advantageously, the printing element portions 76 are formed as integral parts of the peripheral flange portion 59 of the printer wheel. From FIG. 3, it will be understood that the printer wheel can be rotated, as a result of cooperation between pawl 62 and ratchet wheel 55, to bring any desired one of the printing element portions 76 into centered position, aligned with the longitudinal axis of the electromagnet. In such position, the printing element portion is directed away from the outer surface of edge flange 4 and is spaced outwardly therefrom, so as to be well exposed for engagement by any conventional printing medium. Thus, for example, the combination of a sheet of carbon paper and a card on which the impression is to be printed can be forced against the particular printing element portion 76 which, as a result of rotation of the printed wheel, occupies the centered position seen in FIG. 3.

Referring to FIGS. 1 and 2, the portion of the device occupied by the electromagnet and armature is closed by a closure plate 77 secured to frame plate 1, as by screws 78. Plate 77 includes an opening 79 of such size and shape as to accommodate the combination of bobbin 13 and winding 8 of the electromagnet. Similarly, the frame plate 1 is provided with an opening 80, FIGS. 2 and 4, the openings 79 and 80 being in alignment with each other in a direction normal to the frame plate. From FIG. 2, it will be seen that the closure plate 77 lies within the space defined by edge flanges 2, 3 and 5 and, in its secured position, is spaced from frame plate 1 by a distance smaller than the overall thickness of the winding 8. On the other hand, the thickness of the winding 8 is such that, when the electromagnet and closure plate 77 are in finally assembled position, as seen in FIG. 2, the sides 8a of the winding are spaced inwardly from the outer faces of frame plate 1 and closure plate 77, respectively. In its side portions adjacent edge flanges 2 and 3, the closure plate 77 is provided with elongated depressions 81 and 82 which are of such size and configuration as to be forced against the outer legs 11 and 12, respectively, of core 7 when closure plate 77 is finally secured by the screws 78. Thus, the closure plate, when properly secured, cooperates with locator member 21 to clamp the core 7, and thus the entire electromagnet, rigidly in a predetermined position on the frame plate.

Figure 9:
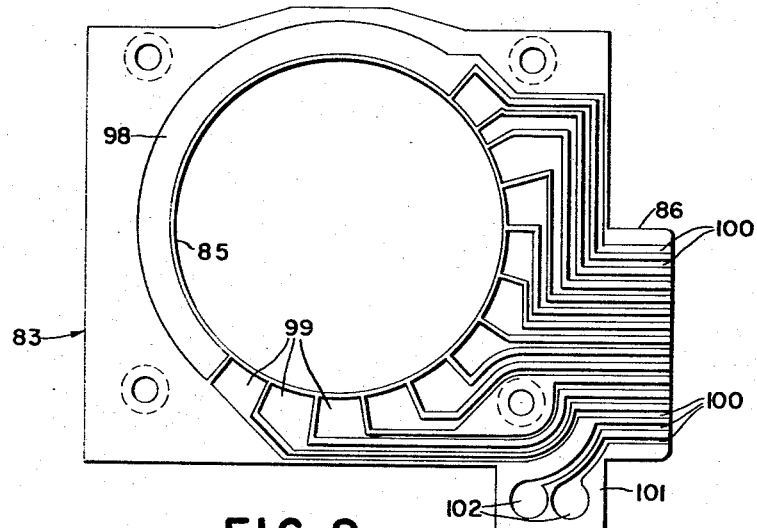
FIG. 9 is a rear elevational view of a printed circuit employed in the device of FIG. 1.

The remainder of the assembly is closed by a printed circuit board indicated generally at 83 and shown in FIGS. 1 and 9. Secured rigidly to frame plate 1 in any suitable fashion, as by means of screws 84, the printed circuit board occupies a position in the same plane as closure plate 79 and, therefore, within the space defined by edge flanges 2–4, the board being provided with a circular opening 85 which accommodates portion 57 of printer wheel 54. The board includes a projecting tab portion 86, FIG. 1, and edge flange 2 is provided with a suitable notch to accommodate portion 86.

Formed of any suitable electrical insulating material, the printer wheel 54 carries a rotating contact assembly comprising spring arms 87 and 88. Arm 88 is secured at one end to portion 58 of the printer wheel, as by any suitable fastener 89, the arm extending arcuately, concentric with the axis of rotation of the printer wheel. The other end of arm 87 carries a contact button 90. Arm 88 is identical with arm 87, being fixed to portion 58 of the printer wheel at one end, by a fastener 91, and carrying a contact button 92 at its other end. The spring arms 87 and 88 are accommodated by arcuate recesses 93 and 94, respectively, formed in printer wheel portion 58. As will be clear from FIGS. 2 and 3, the contact arms 87 and 88 are presented on that surface of printer wheel portion 58 which is directed toward the printed circuit board 83. As seen in FIG. 10, the two arms 87 and 88 are electrically interconnected by a conductor 95 which lies against the opposite side of the printer wheel and is connected to the spring contact arms by fasteners 89 and 91. The arms 87 and 88 are of thin spring sheet metal capable of being easily deflected, yet offering adequate spring force for good engagement of the contact buttons with cooperating fixed contact elements carried by the printed circuit board. Advantageously, portion 58 of the printer wheel is provided with circular openings 96 and 97, respectively, disposed in registry with the end portions of spring arms 87 and 88 which carry the contact buttons.

The printed circuit board 83 is in the form of a sheet of suitable stiff electrical insulating material, conductive portions being established, by conventional printed circuit techniques, on the surface of the printed circuit board which is directed toward frame plate 1 when the board is properly secured thereto by screws 84. The conductive circuit portions on the printed circuit board include an arcuate, continuous portion 98 which extends for 180° about opening 85, and a plurality of angularly spaced, smaller conductive portions 99 disposed in the remaining 180° of the circular area surrounding opening 85. Each of the conductive portions 98 and 99 is provided with a lead strip 100, the lead strips extending outwardly along the surface of the projecting tab 86 so as to be exposed beyond edge wall 2 for ease of electrical connection to the equipment with which the device is associated in use. Since each of the portions 98 and 99 is connected to a different one of the lead strips, the portions 98 and 99 are thus individually connectable to appropriate points in the associated circuitry.

The printed circuit board 83 also includes a tab 101 which, when the circuit board is properly installed on the frame plate, projects toward end flange 5. Tab 101 carries two conductive portions 102 which are each connected to a different one of the lead strips 100 and provide means for connecting supply conductors to the terminals of winding 8 of the electromagnet.

Referring to FIG. 9, it will be noted that each of the conductive portions 99 is diametrically opposed, across opening 85, to a part of arcuate conductive portion 98. Accordingly, when the printer wheel 54 and the printed circuit board 86 are properly installed, one of the contact buttons 90, 92 will always engage the arcuate conductive portion 98 at any time when the other of the contact buttons engages one of the angularly spaced conductive portions 99. Thus, whenever one of the contact buttons engages a portion 99, the combination of the contact buttons, the spring arms 87 and 88, and conductor 95 will be effective to establish an electrical connection between the corresponding two lead strips 100.

In the particular embodiment shown, the printer wheel is provided with twenty-two of the printing element portions 76. The total of twenty-two of the elements 76 can be considered as consisting of two series each extending for 180° and each including eleven printing elements. Typically, the two series can be identical, each including printing elements carrying the characters commencing with zero and progressing to 9, plus one blank printing element which prints no character. The elements 76 are so arranged on the printer wheel, relative to the diametrically opposed positions of contact buttons 90 and 92, that a given element of one of the two 180° series of elements 76 will be exposed through opening 75 and centered on the longitudinal axis of the electromagnet whenever contact button 90 engages a particular one of the contact portions 99, and that the same element of the other 180° series of elements will be similarly exposed when contact button 92 engages the same portion 99. Thus, stepping the printer wheel through one complete revolution, as a result of operation of the pawl-and-ratchet mechanism, will cause each of the characters 0–9 and blank to appear twice at its centered position relative to opening 75. Further, to step the printer wheel from one character to the next requires an angular movement of the printer wheel of only somewhat more than 16°.

Figure 7:
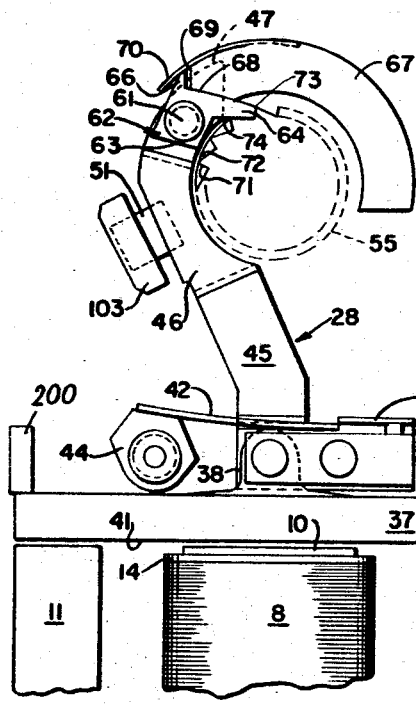
FIGS. 7 and 8 are side elevational views illustrating the positional relationships of parts of the device when the electromagnet thereof is de-energized (FIG. 7) and energized (FIG. 8)

Considering FIG. 7, it will be seen that, when the electromagnet is deenergized, spring 42 is effective to pivot the lever 26 in a clockwise direction, so that the pawl 62 turns the ratchet wheel 55 in a clockwise direction until surface 65 of the pawl comes into engagement with surface 68 of member 67, preventing further movement of the lever. The ratchet wheel connot over-travel, since pawl arm 64 is engaged with the short face of one tooth of the ratchet wheel and the long face of the next preceding tooth and any tendency for the pawl to continue its rotation will simply force the pawl more firmly into engagement with stop surface 58. With the lever in this position, armature 36 is spaced from the pole faces presented by legs 10–12 of core 7, but this space is small and the armature, because of its pivotal attachment to the lever, rests in a position in which the flat face 41 of the armature is parallel to the pole faces of the core.

Figure 8:
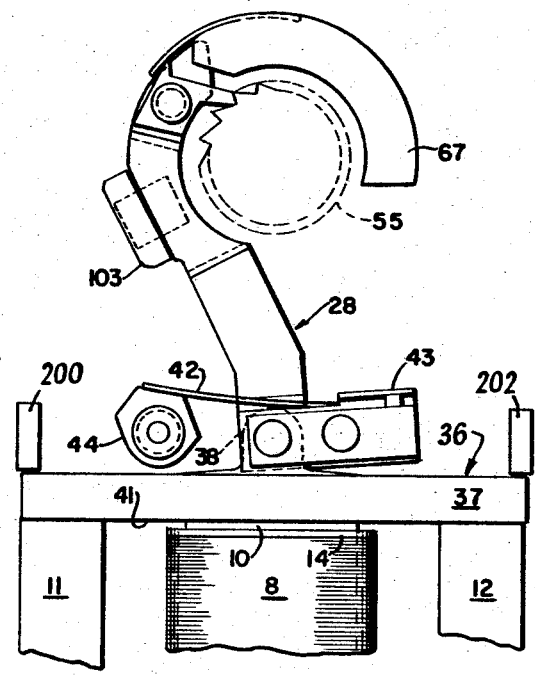

When the electromagnet is energized, armature 36 is actuated magnetically into engagement with the pole faces presented by the ends of legs 10–12, as indicated in FIG. 8. Such movement of the armature is substantially rectilinear, taking place entirely within the plane defined by core legs 10–12 and involving a slight shifting of the armature to the right, as viewed in FIG. 8, because of the pivotal attachment of the armature to lever portion 27. Because of the manner in which the armature is pivotally attached directly to lever 26, the lever is pivoted in a counterclockwise direction as a result of actuation of the armature. The pawl 62, being pivotally mounted, simply retreats along the periphery of ratchet wheel 55, reaching a position in which the tip of pawl arm 64 is engaged with both a long side and a short side of two adjacent teeth of the ratchet wheel, as seen in FIG. 8. Throughout the counterclockwise movement of lever 26, the pawl is caused to ride the teeth of the ratchet wheel by reason of the biasing action of leaf spring 70. The slide bearing member 51 is provided with a portion 103, FIGS. 7 and 8, disposed to act as a stop for preventing overtravel of the lever 26 during its counterclockwise movement as the armature is actuated toward the pole faces of the electromagnet.

When the electromagnet is again deenergized, spring 42 actuates the lever in a clockwise direction again, energy having been stored in spring 42 as a result of actuation of the armature. Accordingly, the relative positions illustrated in FIG. 8 are achieved as a result of energization of the electromagnet, and a return to the positions seen in FIG. 7 results each time the electromagnet is deenergized. Thus, successive energization and deenergization of the electromagnet is effective to rotate the ratchet wheel 55 in a stepwise fashion and in a clockwise direction.

Secured to frame plate 1, or to side edge flanges 2, 3 and positioned immediately above main body portion 37 of armature 36 are resilient shock absorbing bumpers 200, 202 which may be formed from rubber or similar material into a pad-like configuration. Bumpers 200, 202 are so positioned that the movement of armature body portion 37, when travelling from the actuated to unactuated position, is progressively retarded to provide a shock absorbing action and impart a smooth indexing motion to ratchet wheel 55.

A detent spring 104 has one end secured to side flange 3 adjacent end flange 4, the spring projecting into engagement with the periphery of printer wheel 54. Spring 104 is a leaf spring and is disposed at such an angle, generally tangential to the printer wheel, that the offset tip 105 of the detent spring simply rides the periphery of the printer wheel ineffectually when the wheel rotates in a clockwise direction, but engages a side 106 of one of the elements 76, stopping the wheel, if the wheel attempts to rotate counterclockwise. To aid the action of the detent spring, the edge 76a of each element 76 which trails as the printer wheel rotates in a clockwise direction is made relatively long and radially disposed, while the opposite edge 76b of each element 76 is short, as seen in FIG. 3. Between each adjacent pair of elements 76, the peripheral portion 76c of the printer wheel between each adjacent pair of elements 86 slants outwardly from the root of the corresponding edge 76a to the shallower root of the corresponding edge 76b. Thus, when the printer wheel turns in a clockwise direction, the detent spring is deflected outwardly by each surface portion 76c and rides easily over the next preceding element 76. When the wheel attempts to turn counterclockwise, however, the tip 105 of spring 104 rides down the surface portion 76c and engages in the angle between that surface and the adjacent edge 76a.

Figure 15:
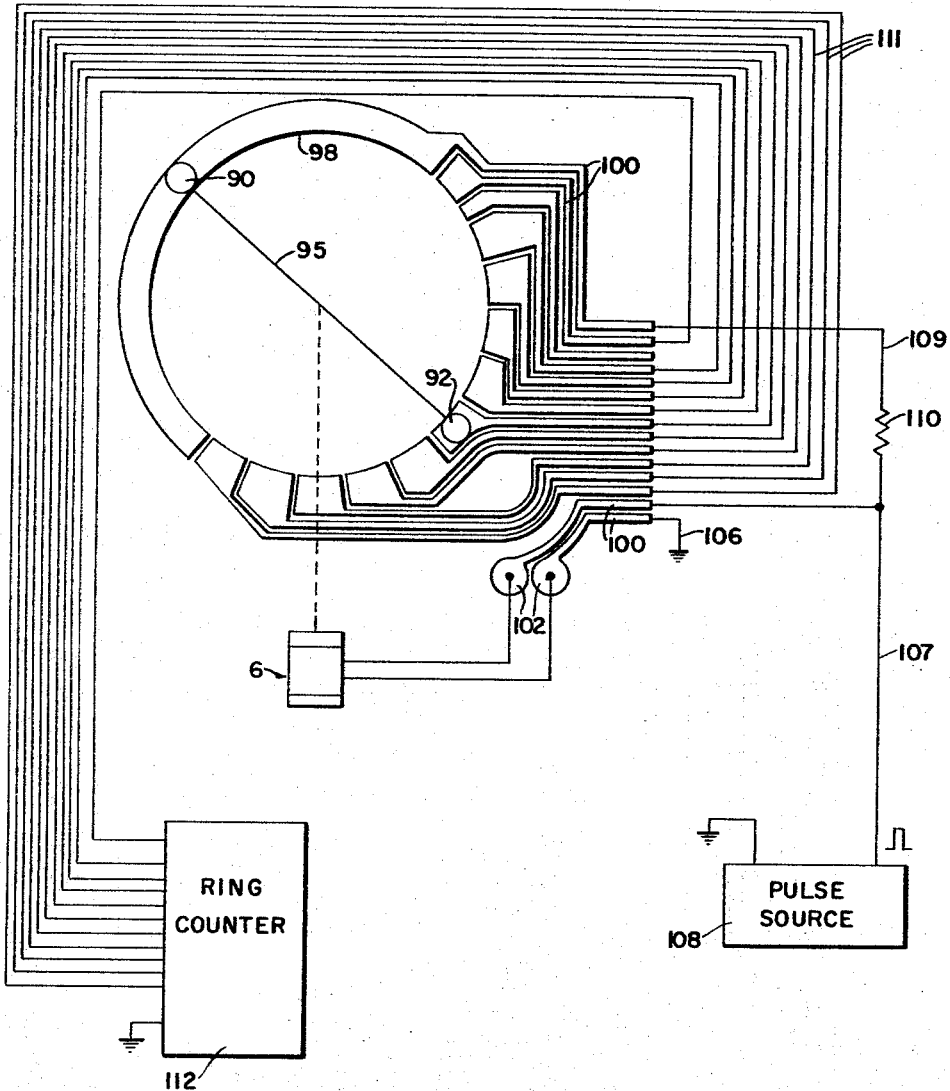
FIG. 15 is a schematic diagram of a typical circuit arrangement for the invention in use.

FIG. 15 illustrates one typical circuit arrangement for accomplishing periodic energization of electromagnet 6 in accordance with digital information delivered by a data processing system. One of the conductive portions 102 is connected to ground by its respective lead strip 100 and conductor 106. The other conductive portion 102 is connected, by its lead strip 100 and conductor 107 to a source 108 of sequential pulses suitable for energizing the electromagnet. The arcuate conductive portion 98 of the printed circuit board is connected, by its respective lead strip 100, conductor 109 and resistor 110 to conductor 107 and hence to the output of pulse source 108. Each of the individual conductive portions 99 of the printed circuit board is connected, by its respective lead strip 100 and the appropriate one of conductors 111, to a terminal of a ring counter 112 forming part of the data processing system to which the device is to respond. Depending upon the output condition of the data processing system, ring counter 112 is operative to connect to ground a particular one of the individual conductive portions 99 of the printed circuit board. Assume that contact button 90 engages arcuate conductive portion 98 of the printed circuit board, and that contact button 92 engages one of the individual conductive portions 99 other than that individual portion connected to ground by the ring counter. This being so, the pulses of electrical power provided by pulse source 108 will be effective to cyclically energize electromagnet 6, resulting in stepwise actuation of the printer wheel 54, until one of the contact buttons 90, 92 engages that individual conductive portion 99 grounded by operation of the ring counter. When that occurs, the next successive pulse, and all pulses thereafter provided from source 108, will be shunted via the circuit portion comprising conductor 109, resistor 110, arcuate conductive portion 98, the contact buttons 90, 92, and their interconnecting conductor 95, and the corresponding conductor 111. Thus, under the control of the ring counter 112, the device is operative to step the printer wheel to a predetermined position in which, of course, the printing element portion 76 which corresponds to the data output of the data processing system is presented through opening 75.

Figure 14:
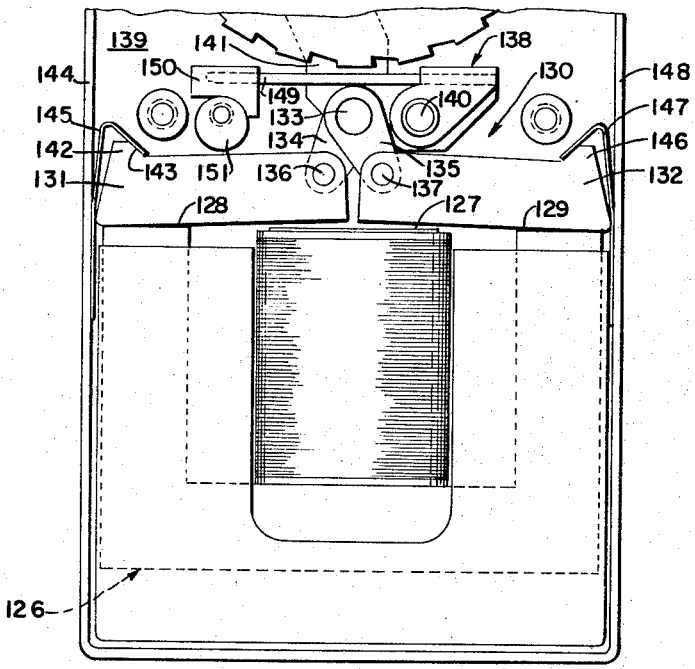
FIG. 14 is a fragmentary side elevational view of a device similar to that of FIG. 1 but employing a modified form of armature structure.

FIG. 14 illustrates a modified form of armature structure and its association with the pawl-carrying lever, in accordance with the invention. Here, the electromagnet 126 is identical with electromagnet 6, described hereinbefore, and comprises flat pole faces 127-129 presented by the three legs of the core and all lying in the same plane. The armature structure, indicated generally at 130, includes two identical magnetic members 131 and 132. Members 131 and 132 are arranged generally end-to-end and extend transversely of the electromagnet adjacent to the pole faces 127-129. The adjacent ends of armature members 131 and 132 are connected to a pivot pin 133 by links 134 and 135, respectively. Link 134 is pivoted to armature member 131 at 136, while link 135 is pivoted to armature member 132 at 137.

The pawl-carrying lever 138 is pivotally mounted on frame plate 139 by a pivot pin 140 which is spaced laterally from the longitudinal axis of the electromagnet. The pivotal axes at 133, 136, 137 and 140 are all mutually parallel, extending at right angles to the frame plate. Lever 138 includes an arm 141, the balance of the structure, including the pawl and ratchet mechanism and printer wheel being identical with the embodiment of the invention hereinbefore described with reference to FIGS. 1–13.

At its end opposite link 134, armature member 131 is provided with an ear 142 which projects away from the electromagnet and includes a surface 143 slanting inwardly, toward the electromagnet. The frame plate is provided with a side edge flange 144 to which is secured a leaf spring 145. Spring 145 includes an end portion which slants inwardly and toward the electromagnet, generally in the same direction as does surface 143 of ear 142. This end of spring 145 is engaged with surface 143 to resiliently urge the corresponding end of armature member 131 both toward flange 144 and against pole face 128. At its end opposite link 135, armature member 132 is provided with an ear 146 identical with ear 142, and a leaf spring 147 is secured to edge flange 148 to cooperate with ear 146 and urge armature member 132 both toward flange 148 and against pole face 129.

Lever 138 is pivotally biased away from the electromagnet by a spring 149 which has one end secured to the lever and is provided at its other end with a cam follower 150. Follower 150 engages a rotatable cam 151, the combination of the cam and follower acting as means by which spring 149 can be adjustably distorted to apply to the lever 138 the desired resilient biasing force. Because of the action of the biasing spring 149, armature members 131 and 132 occupy the positions seen in FIG. 14 when the electromagnet is deenergized. Under these circumstances, the adjacent ends of the two armature members are spaced away from pole face 127, even though the outer ends of the armature members are in respective engagement with the outer pole faces. When the electromagnet is energized, the two armature members are actuated in generally pivotal fashion, the adjacent ends thereof being moved into engagement with pole face 127. Such movement is transmitted to lever 138, by links 134 and 135, so that energization of the electromagnet results in a counterclockwise pivotal movement of the lever. Upon deenergization of the electromagnet, the lever returns to its normal position, to which it is biased by spring 149.

Though particularly advantageous embodiments of the invention have been shown and described for illustrative purposes, it will be obvious to those skilled in the art that various changes and modifications can be made therein without departing from the scope of the invention as defined in the appended claims.

What is claimed is:

1. In a stepping motor, the combination of a ratchet wheel;

means mounting said ratchet wheel for rotation about a first axis;
a lever;
means mounting said lever for pivotal movement about a second axis;
pawl means carried by said lever and operatively arranged to engage and drive said ratchet wheel when said lever is pivoted toward said ratchet wheel;
an electromagnet having a longitudinal axis and presenting a pole face extending across said longitudinal axis;
a magnetic armature structure disposed adjacent said pole face and pivotally connected to said lever,
the axis of rotation of said ratchet wheel, the axis of pivotal movement of said lever, and the axis of the pivotal connection between said armature structure and said lever are all parallel to each other and at right angles to the longitudinal axis of said electromagnet,
the axis of pivotal movement of said lever being spaced laterally from the longitudinal axis of said electromagnet, energization of said electromagnet causing said armature structure to be actuated toward said pole face, and such actuation of said armature structure causing said lever to pivot in one direction; and
means yieldably biasing said lever in the opposite direction,
said armature structure includes a central portion extending across the longitudinal axis of said electromagnet,
the pivotal connection between said armature structure and said lever being located at said central portion.

2. In a stepping motor unit suitable for modular side-by-side installation with other like units, the combination of
housing means comprising a flat nonmagnetic plate and narrow edge walls projecting from one side of said plate to define therewith a shallow chamber;
an electromagnet comprising a multi-legged core and a winding carried by one of the legs of said core,
the legs of said core lying in a common plane and having a thickness smaller than the depth of said chamber,
said electromagnet being mounted in said chamber with said legs parallel to and immediately adjacent to said plate,
said legs having end portions presenting pole faces lying in a common plane at right angles to said plate;
a lever mounted on said plate of said housing means for pivotal movement about an axis extending at right angles to said plate and spaced from said pole faces,
said lever including an arm portion extending away from said electromagnet and in close proximity to said plate;
a flat armature structure disposed in said space adjacent said pole faces,
said armature structure being located between said lever and said pole faces and being pivotally attached to said lever;
a ratchet wheel mounted on said housing means for rotation about an axis parallel to the axis of pivotal movement of said lever,
said ratchet wheel being located adjacent the end of said arm portion of said lever;
pawl means carried by said arm portion of said lever and arranged to operatively engage and drive said ratchet wheel when said lever is pivoted in a given direction; and
spring means connected to said lever to bias the combination of said lever and said armature structure in a direction tending to move said armature structure away from said pole faces.

3. In a stepping motor, the combination of an electromagnet having a longitudinal axis and presenting a pole face extending across said axis;
an armature structure comprising two magnetic members arranged generally end-to-end, with the adjacent ends of said members located adjacent said pole face and the opposite ends of said members spaced laterally from the longitudinal axis of said electromagnet, and
means restraining said opposite ends of said magnetic members against movement axially of said electromagnet;
a lever located on the side of said armature structure opposite said electromagnet;
means mounting said lever for pivotal movement about an axis which extends at right angles to the longitudinal axis of said electromagnet and is displaced laterally from said longitudinal axis,
said lever having a first portion adjacent said adjacent ends of said magnetic members, and an arm portion projecting away from said armature structure;
two links each having one end pivotally connected to said first portion of said lever,
the other ends of said links each being pivotally connected to a different one of said adjacent ends of said magnetic members;
a ratchet wheel located adjacent the end of said arm portion of said lever;
means mounting said ratchet wheel for rotation about an axis parallel to the axis of pivotal movement of said lever;
pawl means carried by said arm portion of said lever and operatively arranged to engage and drive said ratchet wheel when said lever is pivoted in one direction; and
spring means connected to said lever to bias the same in said one direction,
energization of said electromagnet causing said adjacent ends of said magnetic member to be actuated toward said pole face, such movement being imparted to said lever via said links to move said lever in its other direction.

4. In a device of the type described, the combination of
a frame member presenting a flat surface;
a driven structure including a ratchet wheel;
means mounting said driven structure on said frame member for rotation about an axis at right angles to said flat surface;
an electromagnet comprising a flat core including a plurality of legs lying in a common plane and terminating in free ends which present pole portions facing in the same direction, and an energizing winding carried by one of said legs,
said core being parallel to and mounted on said flat surface in a location spaced from said ratchet wheel;
a flat magnetic armature structure disposed parallel to said flat surface and adjacent said pole portions,
said armature structure being arranged for movement toward and away from said pole portions in a plane parallel to said flat surface;
a lever;
means mounting said lever on said frame member for pivotal movement about an axis at right angles to said flat surface,
said lever being located between said armature structure and said ratchet wheel and including a first portion spaced from the axis of pivotal movement of said lever and disposed adjacent said armature structure, and an arm projecting into proximity with said ratchet wheel;
means pivotally interconnecting said armature structure and said first portion of said lever, whereby movement of said armature toward and away from said pole portions imparts pivotal movement to said lever; and
pawl means carried by said arm and operatively arranged to engage and drive said ratchet wheel when said lever is pivoted in one direction;

said lever being yieldingly biased in opposition to movement imparted thereto by actuation of said armature structure toward said pole portions when said electromagnet is energized.

5. A device according to claim 4 including shock absorbing means positioned in the path of travel of said armature, and effective after said armature moves away from said pole portions to apply a retarding force to said armature to progressively retard further movement thereof.

6. A device according to claim 5, wherein said shock absorbing means includes at least one bumper formed from resilient material and positioned in spaced relation to said armature when said armature is adjacent said pole portions.

7. A device according to claim 4, wherein said driven structure includes
a wheel member having a hub, a flat body portion from which said hub projects, and a peripheral portion projecting axially from said body portion in the same direction as said hub,
said ratchet wheel being fixed to said wheel member and surrounding said hub between said body portion and said flat surface of said frame member,
said peripheral portion extending from said body portion toward said frame member;
said frame member having an opening across which said peripheral portion of said wheel moves,
said arm of said lever having an offset portion disposed in said opening, whereby said arm projects past said peripheral portion of said wheel member without being engaged thereby.

8. A device according to claim 7, wherein
said frame member is provided with a second opening adjacent the periphery of said ratchet wheel,
said arm of said lever is provided with a second offset portion disposed in said second opening, and
said pawl means is mounted on said second offset portion of said arm.

9. A device according to claim 7, wherein said frame member is a flat nonmagnetic plate having edge flanges projecting from said flat surface and surrounding said electromagnet, armature structure and driven structure.

10. A device according to claim 9, wherein said flat core is disposed immediately adjacent said flat surface, said edge flanges projecting beyond said core,
the device further comprising
flat closure means carried by said frame member spaced from said flat surface, and extending across the space defined by said edge flanges,
said core, said armature structure and said ratchet wheel being disposed between said flat surface of said frame member and said flat closure means,
the thickness of said energizing winding being greater than the space between said flat surface and said flat closure means,
said frame member and said closure means each being provided with an opening which accommodates said energizing winding.

11. A device according to claim 10, wherein said closure means comprises a flat member of electrical insulating material extending across an area traversed by said wheel member,
said flat member of insulating material being provided with at least one electrically conductive element exposed toward said wheel member, and
said wheel member is provided with at least one contact disposed to engage said conductive element.

12. In a stepping motor operated device to be installed in a modular side-by-side assembly with other like devices, the combination of a flat supporting plate;
a driven structure mounted on said plate for rotation about an axis at right angles to the plate, said driven structure comprising
a hub,
ratchet wheel means concentric with said hub,
a generally flat circular portion carried by said hub at the end thereof opposite said plate, said ratchet wheel means being disposed between said circular portion and said plate, and
a peripheral portion joined to said circular portion and projecting toward said plate, said peripheral portion being of substantially larger diameter than said ratchet wheel means;
a flat electromagnet carried by said plate and spaced from said driven structure,
said electromagnet presenting a pole face directed toward said driven structure;
a flat magnetic armature structure disposed adjacent said pole face and parallel to said plate;
a lever located between said armature structure and said driven structure and mounted on said plate for pivotal movement about an axis parallel to the axis of rotation of said driven structure,
said lever including a portion adjacent said armature structure, and an arm extending along said plate to the location of said ratchet wheel means,
said armature structure being pivotally connected to said portion of said lever;
pawl means carried by said arm and disposed to engage said ratchet wheel to drive said driven structure when said lever is pivoted in one direction; and
spring means connected to said lever to bias the combination of said lever and armature structure in a direction tending to move said armature structure away from said pole face.

13. In a device of the type described, the combination of
housing means including at flat frame plate;
a driven structure mounted on said housing means for rotation about an axis at right angles to said frame plate, said driven structure comprising
a hub having one end adjacent said frame plate,
a circular web portion joined at its center to said hub at a point spaced from said one end, said web portion being parallel to and spaced from said frame plate,
a peripheral portion joined to said circular portion and projecting therefrom toward said frame plate, and
ratchet wheel means carried by said hub and disposed between said web portion and said frame plate,
said peripheral portion and said ratchet wheel means being concentric and the diameter of said peripheral portion being large as compared to the diameter of said ratchet wheel means,
said peripheral portion being provided with a plurality of circumferentially spaced projections each having an edge which trails when said driven structure is rotated in a given direction;
an electromagnet mounted on said housing means;
a lever mounted on said frame plate for pivotal movement about an axis parallel to the axis of rotation of said driven structure,
said lever including an arm portion extending along said frame plate and between said peripheral portion and said frame plate to a location adjacent said ratchet wheel means;
pawl means carried by said arm portion and operative to engage said ratchet wheel means and drive said driven structure in said given direction when said lever is pivoted in one direction;
a magnetc armature structure operatively disposed relative to said electromagnet and coupled to said lever;
resilient means biasing the combination of said lever and said armature structure in a direction to move said armature structure away from said electromagnet; and
a detent spring secured to said housing means and projecting generally tangentially into engagement with said peripheral portion of said driven structure, said detent spring being engageable with the trailing edges of said circumferentially spaced projections to restrain said driven structure from rotation in a direction opposite to said given direction opposite to said given direction.

14. A device according to claim 13, wherein the outer surface of said peripheral portion between each adjacent pair of said projections slants outwardly from the trailing edge of one projection toward the other projection of the pair.

15. In a device of the type described, the combination of housing means comprising a flat frame plate and narrow edge flanges projecting from one side of said plate, one of said edge flanges having an opening therein;

a driven structure mounted in said housing adjacent said one edge flange for rotation about an axis at right angles to said plate, said driven structure comprising a hub having one end adjacent said plate, a circular web portion joined at its center to said hub and spaced from said plate, a peripheral portion joined to said web and projecting toward said plate, and ratchet wheel means carried by said hub and disposed between said web and said plate, the diameter of said peripheral portion being large as compared to the diameter of said ratchet wheel means, said peripheral portion extending outwardly through said opening in said one flange;

an electromagnet mounted in said housing and spaced from said driven structure;

a magnetic armature structure disposed in said housing adjacent said electromagnet;

a lever mounted on said plate for pivotal movement about an axis which is at right angles to said plate and located between said armature and said driven structure, said lever including an arm projecting along said plate and having an end portion disposed between said web portion and said plate, said armature being operatively connected to said lever;

pawl means carried by said end portion of said arm and operative to engage said ratchet wheel means to rotate said driven structure when said lever is pivoted in one direction;

resilient means in said housing means and connected to bias the combination of said said lever and armature in a direction tending to move said armature structure away from said electromagnet;

a closure plate extending between said edge flanges and parallel to said plate in the area occupied by said driven structure, said closure plate being provided with a plurality of electrically conductive portions insulated from each other and exposed toward said driven structure; and at least one electrical contact carried by said driven structure and disposed to successively engage said conductive portions as said driven structure is rotated.

References Cited

UNITED STATES PATENTS

| | | | |
|---|---|---|---|
| 3,087,077 | 4/1963 | Hall | 310—49 X |
| 3,153,755 | 10/1964 | Korda | 318—134 |
| 3,249,718 | 5/1966 | Jensen | 335—140 X |

MILTON O. HIRSHFIELD, *Primary Examiner.*

D. F. DUGGAN, *Assistant Examiner.*